Patented Apr. 28, 1936

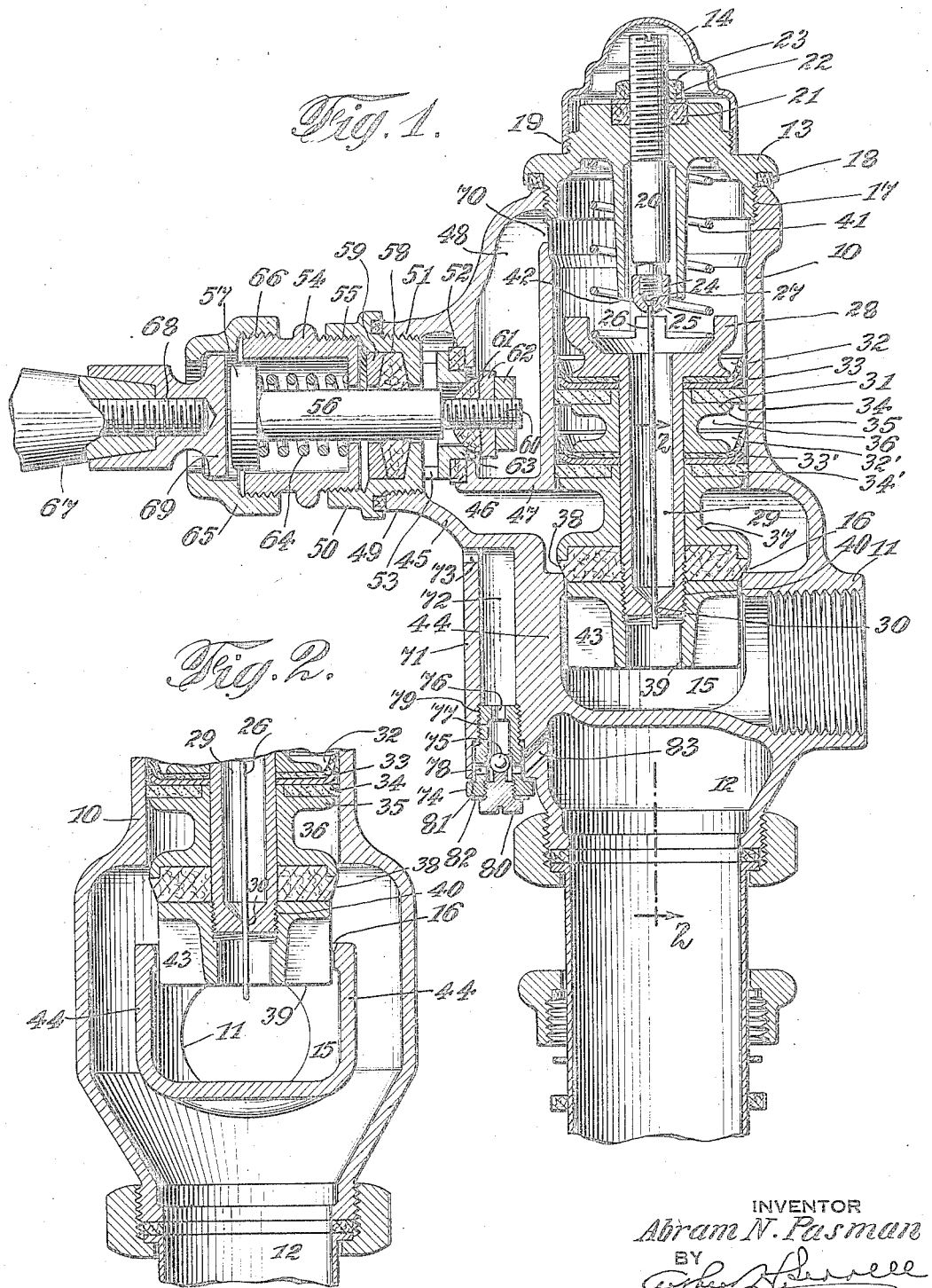

2,039,109

UNITED STATES PATENT OFFICE 2,039,109

FLUSH VALVE

Abram N. Pasman, Waterbury, Conn., assignor to Scovill Manufacturing Company, Waterbury, Conn., a corporation of Connecticut Application September 5, 1929, Serial No. 390,459
Renewed September 26, 1935

3 Claims. (Cl. 137—93)

My present invention relates to an improvement in flush valves. The type of valve to which this invention generally relates is shown and described in Letters Patent No. 1,600,774, September 21, 1926. The object of my invention is to provide means whereby a backflow from the outlet into the inlet will be positively prevented regardless of the conditions existing in either connection. Under normal conditions the flush valve shown and described in Letters Patent No. 1,600,774, September 21, 1926 will operate entirely satisfactorily, but under different conditions, for example, when the supply pipes are drained, creating a negative pressure therein, or when there is a stoppage in the waste pipe which due to the many cross connected pipes in modern plumbing methods is easily possible, the contaminated water from the waste backs up into the valve. It has been found that in actual operation under these conditions that the pressure exerted is sufficient to cause a direct flow of the contaminated or waste water from the outlet connection into the inlet connection. This condition whereby the fresh water supply is polluted and made unfit for ordinary use is very undesirable and it is obvious that to protect the health of society the causes of such conditions must be removed.

I attain this object by means of a vent associated with and working in connection with the main valve and a specially constructed piston as will be described in greater detail hereinafter.

Reference is made to the drawing in which Figure 1 is a central longitudinal section of the improved valve.

Fig. 2 is a vertical section along lines 2—2 Figure 1 showing the valve open.

The improved flush valve comprises the usual cylindrical casing 10 in which there is an inlet connection 11 and an outlet connection 12. The inlet connection is preferably at the side of the casing and the outlet connection at one end thereof, the opposite end of the casing being provided with a head 13 and a cap 14.

Adjacent to the outlet connection 11 is located an inlet chamber 15, with a circular wall 44, the upper portion of which forms a valve seat 16 surrounding the discharge from the chamber.

A portion of the head 13 is screw threaded as indicated at 17 to be connected in the tapped upper end of the casing 10. A bonnet washer 18 makes a tight fit and prevents leaks between these said parts. The opposite end of the head 13 is also screw threaded as indicated at 19 in order to receive the cap 14. The apparatus includes a stem 20 which passes through a centrally disposed tap opening in the head 13 and is adjusted longitudinally and maintained in position therein by a stem washer 21, a brass friction washer 22 and a lock nut 23. At the inner end of the stem 20 is provided a retaining nut 24 which preferably has a round head 25 with a centrally disposed opening therein for a rod 26 which extends through the opening, said rod being maintained in position in the retaining nut 24 by a head 27.

Located in the cylindrical casing 10 there is a plunger body 28 so formed that there is a hollow central passage 29 which terminates in a port 30 of materially decreased diameter. The rod 26 passes through the port 30 and the diameter of the rod is appreciably less than the diameter of the port. A piston 31 is mounted on the plunger body 28 as shown in the drawing Figure 1. In the order in which the elements are mounted on the plunger body 28, the piston 31 comprises first a cup leather washer 32, a spacer 33, a cotton washer 34, a separator 35, which is constructed in the form of a ring having a groove leaving a space 36 between the ring and the casing in which is packed a suitable lubricant such as vaseline to insure an easy movement of the piston 31 along the inner side of the casing 10. Directly below the separator 35 is a second set of washers 32' and 34' and a spacer 33', a plunger seat washer retainer 37, a seat washer or valve 38. All of these elements are tightly held on the plunger body 28 by a plunger guide nut 39 screwed on to the plunger body as indicated at 40. The uppermost part of the plunger body 28 is formed to receive a plunger spring 41. The upward movement of the piston 31 is limited by a guard 42 located on the innerside of the head 13. The plunger guide nut 39 has oppositely disposed ribs 43 which operate with the travel of the piston 31 to guide it along the wall 44 of the inlet chamber.

The casing is also provided with a wall 45 making provision for a passage 46 between the same and the adjacent portion of the casing 10. Also connected to the cylindrical wall is an internal wall 47 making provision for a chamber 48 in which a release valve hereinafter described is located. In the wall 45 there is a boss 49 having a tapped opening therein adapted to receive a gland 50, the screw threaded end of the gland being indicated at 51. At its inner end the gland is fitted with a gasket 52 adapted to surround the discharge opening in the wall 47 and to make a tight joint between the inner end of the gland and said wall. In this portion of the gland there is also a passage or port 53 by means of which when the release valve is open there will be direct communication between the passage 46 and the chamber 48. I also employ a plunger cylinder 54 adapted to be secured in a tapped outer end 55 of the gland 50. In this plunger cylinder 54 there is a plunger 56 which has a head 57 operating in the plunger cylinder. The plunger 56 passes through the gland 50 and also through a packing 58 therein which is maintained in position as illustrated by a suitable washer 59 extending between the outer portion of the packing and the base of the plunger cylinder 54 although other means such as a stuffing box may be employed for the plunger 56. The inner end of the plunger is of reduced diameter as shown at 60 and extends into the chamber 48. The reduced end of the plunger is preferably screw threaded and adapted to carry a release valve 61 which is maintained in position on the reduced end of the plunger by nuts 62 or otherwise. In its closed position the release valve 61 is adapted to bear against a seat 63 provided therefor at the inner end of the gland 50. The operating valve is normally maintained in this seated position by means of a spring 64 surrounding a portion of the plunger 56 and extending between the base of the cylinder 54 and the plunger head 57.

Fitted on the outer end of the plunger cylinder 54 is a cap 65 which is tapped so as to be turned down on the screw threaded portion 66 of the plunger cylinder. The plunger is operated by means of a handle 67 suitably connected in a socket member 68 adapted to pass through an opening in the cap 65 and to have the base 69 of the socket contained and operative within the cap so that by a tilting movement of the handle 67 in any direction the base 69 will bear against the plunger head 57 to force the same inwardly against the action of the spring 64 and thereby move the release valve 61 from its seat 63. In the wall 47 of the casing 10 there is a port 70 making communication between the interior of the cylinder and the chamber 48.

The casing 10 is also provided with a rib 71 located directly opposite the inlet connection 11 as shown in Figure 1 but need not be limited to this position. The rib 71 encloses a vent chamber 72 from which there is a port 73 at the upper end thereof and which at its lower end is fitted with a plug 74 having a ball valve 75 therein and a port 76, the lower side of which acts as a seat 77 for the ball valve when lifted. The plug 74 also has ports 78 and is threaded to be screwed into place as indicated at 79. A screw 80 is fitted into the end of the plug and supports the ball valve 75 when said valve is not in operation. Washers 81 and 82 are placed between the rib 71 and plug 74 and between plug 74 and screw 80 respectively to prevent any leakage between these parts. There is also a port 83 which makes communication between the outlet connection 12 and the chamber in which the ball valve 75 is located.

In the operation of this apparatus the parts normally assume the position shown in Figure 1. The water or other liquid employed with the device acts on the inner end of the piston 31 but the piston is maintained in position by the water or other liquid entrapped between the same and the upper or outer end thereof filling the chamber between this end of the piston and the cylinder head and also filling the chamber 48. As is customary in this type of apparatus when the handle 67 is moved to shift the plunger 56 and unseat the release valve 61, the liquid entrapped is released and permitted to flow through the port 70, through the chamber 48, around the release valve, and through the port 53, through the passage 46 and thus to the outlet connection 12. When the entrapped liquid is thus released the pressure at the inlet connection 11 forces the piston 31 upwardly thereby lifting the valve seat washer 38 from the valve seat 16 and permitting the water to flow direct from the inlet to the outlet connection. The extent of the movement of the piston 31 is limited by the guard 42. When the handle 67 is released and the valve 61 returned to its normal position the water or other liquid under pressure from the inlet connection passes through the port 39 and gradually accumulates in the chamber at the opposite end of the piston thereby forcing the piston in the opposite direction until finally the seat washer 38 is in position on the valve seat 16 thereby shutting off the flow of water or other liquid. The time of closing can be regulated by changing the position of the rod 26 in the port 39 by means of the stem 20 and the lock nut 23.

During the flow in the normal operation of the flush valve the action of the discharging water or other liquid by passing through the port 83 and port 78 will force the ball valve 75 adjacent its seat 77. The chamber 72 is made sufficiently large to retain the water or other liquid which may possibly work its way past the ball valve in the operation of the apparatus. After the flow has ceased the ball valve returns to its normal position (Fig. 1) and air is admitted through port 73, vent 72, port 76, ports 78 and 83 into the outlet connection 12; thus any tendency from suction or otherwise of water or other fluid remaining in the outlet connection 12 is obviated. The admission of air at atmospheric pressure to outlet connection 12 also makes it impossible for water or other fluid in waste connection to pass to the supply due to vacuum therein caused by shutting of water and draining supply pipe.

In the use of the flush valve as hereinbefore described, the same is connected to a supply pipe and a discharge pipe in the usual manner and the normal operation of the apparatus is the same as that in all similarly constructed flush valves in which a valve is seated to shut off the supply against the pressure in the supply line. During normal use and operation the supply cannot be contaminated by material from the waste line. It will be understood, moreover, that under abnormal conditions in the use of the apparatus it is also substantially impossible for the water supply to be contaminated from the waste pipe line. In instances, for example, where it is necessary to shut off the supply and drain the supply line to the flush valve thereby creating a vacuum therein, the vacuum thus created may empty the pressure chamber above the piston as well as the chamber 48, and in so doing unseat the release valve thereby opening a communication through the port 53, the passage 46 to the outlet connection 12, and of course in so doing atmospheric air will be admitted through the port 76 into the plug 74 and by way of the ports 78 and 83 to the outlet connection 12 whereby after the pressure chamber above the piston and the chamber 48 have thus been emptied under these conditions atmospheric pressure will be admitted to the supply line to prevent any further vacuum being created therein. This obviously equalizes the pressure on all sides of the inlet valve and results in the inlet valve being maintained in position against its seat. Consequently no waste matter from the outlet connection 12 can be drawn through the parts of the flush valve to the supply pipe to contaminate the supply when the same is turned on again.

Obviously also under conditions in which a back pressure may be created in the waste pipe and outlet connection 12, the ball valve 75 will be raised and seated to prevent the escape of such waste material from the pipe line and flush valve, and this back pressure may be sufficient to cause the waste material to fill the passage 46 and to operate against the cup leather washers 32' and 32. In which event due to the peripheral portion of the cup leather washers being turned away from the inlet valve seat 16, that is, in a direction in which the inlet valve moves when being seated, the cup leather washers are not forced against the cylinder tending to move the piston and open the valve. Any pressure, therefore, so accumulating in the passage 46 will tend to cause the liquid to seep by the cup leather washers and to increase the pressure in the pressure chamber and the chamber 48 thereby tending to maintain the inlet valve against its seat more securely than the same is held under normal conditions. Consequently this prevents the inlet valve from being raised by any shifting of position of the plunger body. It naturally follows that no contamination of the liquid supply can therefore be caused by a back pressure accumulating in the waste pipe line.

I claim as my invention:

1. In a flush valve, a casing having an inlet chamber and an outlet chamber, a valve controlling communication between the inlet and outlet chambers, means for causing the said valve to seat automatically against the supply pressure in the inlet chamber, a rib on the casing providing an air vent chamber, there being a port leading to the said air vent chamber from the atmosphere, a plug set in the air vent chamber and having a valve chamber therein, there being a port between the air vent chamber and the said valve chamber, a ball valve located in the said valve chamber, and a screw set in the said plug and extending into the valve chamber therein to close the said valve chamber and normally maintain the said ball valve in an initial open position therein, there being a port from the said valve chamber making communication with the said outlet chamber whereby atmospheric air is admitted to the outlet chamber and the passage of liquid from the outlet chamber during the operation of the first named valve is prevented by the lifting of the said ball valve to close the port between the air vent chamber and the said valve chamber.

2. In a flush valve, a casing having an inlet chamber and an outlet chamber, a valve controlling communication between the inlet and outlet chambers, means for causing the said valve to seat automatically against the supply pressure in the inlet chamber, a rib on the casing providing an air vent chamber within the same, a plug set in the base of the air vent chamber having a valve chamber therein, there being a port between the air vent chamber and the valve chamber, a valvular element located in said valve chamber, a screw member forming a closure for the base of the plug, said screw member extending into the valve chamber to maintain the valvular element in a normally open position therein, there being a port from the said valve chamber making communication with the said outlet chamber, whereby atmospheric air is admitted to the outlet chamber, and the passage of liquid from the outlet chamber, during the operation of the first named valve, is prevented by the lifting of the valvular element to close the port between the air vent chamber and the said valve chamber.

3. In a flush valve, a casing having an inlet chamber and an outlet chamber, a valve controlling communication between the inlet and outlet chambers, means for causing the said valve to seat automatically against the supply pressure in the inlet chamber, a rib on the casing providing an air vent chamber situated in a vertical position, there being a port leading from the upper portion of the said air vent chamber to the atmosphere, a plug set in the base of the air vent chamber having a valve chamber therein, there being a port between the air vent chamber and the said valve chamber, a valve located in the said valve chamber, a screw set in the said plug and extending into the valve chamber therein to close the said valve chamber and normally maintain the said valve therein in an initial open position, there being a port from the said valve chamber making communication with the said outlet chamber whereby atmospheric air is admitted to the outlet chamber and the passage of liquid from the outlet chamber, during the operation of the first named valve, is prevented by the lifting of the said second named valve to close the port between the air vent chamber and the said valve chamber.

ABRAM N. PASMAN.